United States Patent [19]

Tsunoda et al.

[11] Patent Number: 4,475,622
[45] Date of Patent: Oct. 9, 1984

[54] EXHAUST SYSTEM FOR MOTOR VEHICLES

[75] Inventors: Kazuhiko Tsunoda; Yasuyuki Tsurumi; Masamichi Komori, all of Saitama, Japan

[73] Assignee: Honda Giken Kogyo Kabushiki Kaisha, Tokyo, Japan

[21] Appl. No.: 442,040

[22] Filed: Nov. 16, 1982

[30] Foreign Application Priority Data

Nov. 25, 1981 [JP] Japan ............................... 56-187719
Nov. 30, 1981 [JP] Japan ........................... 56-176618[U]

[51] Int. Cl.³ ............................................. F01N 1/08
[52] U.S. Cl. ................................... 181/227; 181/252; 181/255
[58] Field of Search ............... 181/227, 228, 240, 255, 181/252; 280/289 R, 289 G; 123/55 AB, 65 PE, 65 A; 180/219; 60/312–314

[56] References Cited

U.S. PATENT DOCUMENTS

| | | | |
|---|---|---|---|
| 3,756,623 | 9/1973 | Whittler | 280/289 G |
| 3,949,829 | 4/1976 | Honda et al. | 181/227 |
| 4,106,288 | 8/1978 | Nagaishi et al. | 181/238 X |
| 4,359,865 | 11/1982 | Nakao et al. | 181/240 X |

*Primary Examiner*—Benjamin R. Fuller
*Attorney, Agent, or Firm*—Irving M. Weiner; Pamela S. Burt; Anthony L. Cupoli

[57] ABSTRACT

An exhaust system for motor vehicles comprising a plurality of exhaust pipes and silencers connected thereto, the silencers being disposed above a rear wheel and at least partially inside a rear cowling. A dynamic effect of the exhaust pipes against the exhaust of an engine is suppressed to an appropriate extent while attaining a favorable external appearance.

13 Claims, 16 Drawing Figures

EXHAUST SYSTEM FOR MOTOR VEHICLES

BACKGROUND OF THE INVENTION

1. Field of the Invention

The present invention relates generally to an exhaust system for motor vehicles. More particularly, the invention relates to an exhaust system for motor vehicles such as two-wheeled and three-wheeled motor vehicles and the like having at least one rear wheel and a rear cowling member extending over the rear wheel so as to substantially cover same.

2. Description of Relevant Art

Within an exhaust pipe operably connected to a gasoline engine there are generally produced pulsating waves at positive and negative pressures induced by exhaust, which pulsating waves affect the exhaust action (a dynamic effect by the exhaust pipe) and further affect the output characteristic of the engine.

Therefore, characteristics of the exhaust system such as inside diameter, length, capacity and shape, which define the characteristic of such pulsating waves, are important factors affecting the engine performance.

Particularly, in motor vehicles such as two-wheeled and three-wheeled motor vehicles and the like, characteristics of the exhaust system are not only relatively important in relation to the weight and dimension of the entire vehicle body but also greatly affect the external appearance. Accordingly, it has been desired to provide an exhaust system having favorable dimensional characteristics, i.e., by arranging the system so that it is capable of decreasing the aforesaid pulsating waves to an appropriate extent while attaining a favorable and novel external appearance.

Moreover, the magnitude of air resistance during travel of motor vehicles such as two-wheeled and three-wheeled motor vehicles and the like depends on the projected area of the front portion of the vehicle, as well as other considerations such as the rider's driving posture and manner of dress. Therefore, it has been attempted in vehicle manufacture to decrease such projected area. Also, with respect to an exhaust pipe disposed on a side of a motor vehicle, which pipe is normally substantially circular in section, it has been desired to suppress the amount of projection thereof in the vehicular transverse direction by taking its shape into consideration while also taking its external appearance into consideration.

The present invention effectively overcomes the above-mentioned problems encountered in the exhaust system in motor vehicles such as two-wheeled and three-wheeled motor vehicles and the like.

SUMMARY OF THE INVENTION

The present invention provides an exhaust system in a motor vehicle having at least one rear wheel and a rear cowling member extending over the rear wheel so as to substantially cover same. The exhaust system comprises at least one exhaust pipe and at least one silencer connected to the rear end of the exhaust pipe, the silencer being disposed at least partially within the interior of the rear cowling member.

It is an object of the present invention to provide an exhaust system which suppresses the dynamic effect of an exhaust pipe to an appropriate extent while attaining a favorable external appearance in a motor vehicle such as a two-wheeled or three-wheeled motor vehicle or the like.

It is another object of the present invention to provide an exhaust system for such motor vehicle which has a relatively reduced air resistance.

The above and further objects, details and advantages of the present invention will become apparent from the following detailed description when read in conjunction with the accompanying drawings.

DETAILED DESCRIPTION OF PREFERRED EMBODIMENTS

Figure 1:
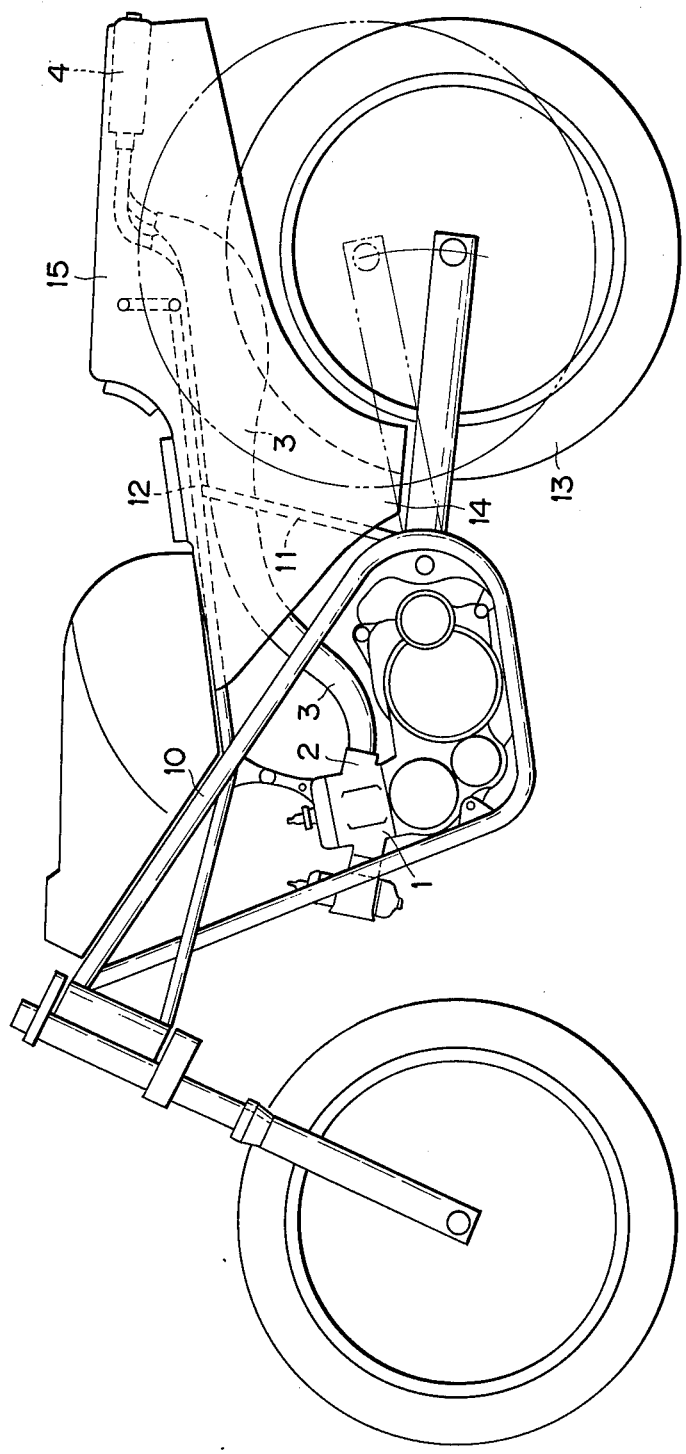
FIG. 1 is a schematic left side view of a two-wheeled motor vehicle provided with an exhaust system according to a first embodiment of the present invention.
Figure 2:
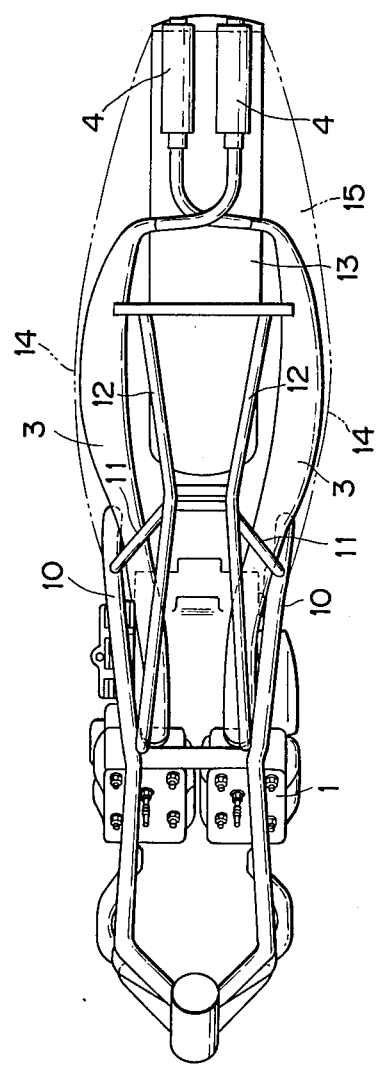
FIG. 2 is a plan view of principal portions of the two-wheeled motor vehicle of FIG. 1.

With reference to FIG. 1, reference numeral 1 designates an engine unit in a two-wheeled motor vehicle. A pair of exhaust pipes 3 respectively connected to right and left exhaust ports 2 of the engine unit 1 are disposed inside center pillars 10 and back stays 11, which pillars and stays are disposed on both the right and left sides of the vehicle body. The exhaust pipes 3 are bent so as to extend up to the level of seat rails 12, are further bent toward the center of the vehicle in positions just behind the rear end portion of the seat rails 12, and then extend beyond the vehicular center line, thus allowing the rear portions of the right and left exhaust pipes 3 to cross each other above a rear wheel 13. Such rear portions of exhaust pipes 3 are connected to a pair of right and left silencers 4 disposed above the rear wheel 13.

The exhaust pipes 3 and the silencers 4 are positioned inwardly of right and left side covers 14 and a rear cowling 15 and are shaped and disposed so as not to interfere with the rear wheel 13 in a fully compressed state (such state being shown in alternate long and two short dashed line in FIG. 1).

In the arrangement described hereinabove, because the right and left exhaust pipes 3 are crossed above the rear wheel 13, they can extend a longitudinally shorter distance. Consequently, it becomes possible to dispose the silencers 4 in positions closer to the vehicular front portion than would be possible if the exhaust pipes 3 were not crossed. Further, because the silencers 4 are disposed above the rear wheel 13 and inside the rear cowling 15, the exhaust system is made compact and there is obtained a vehicular shape having less air resistance.

Figure 3:
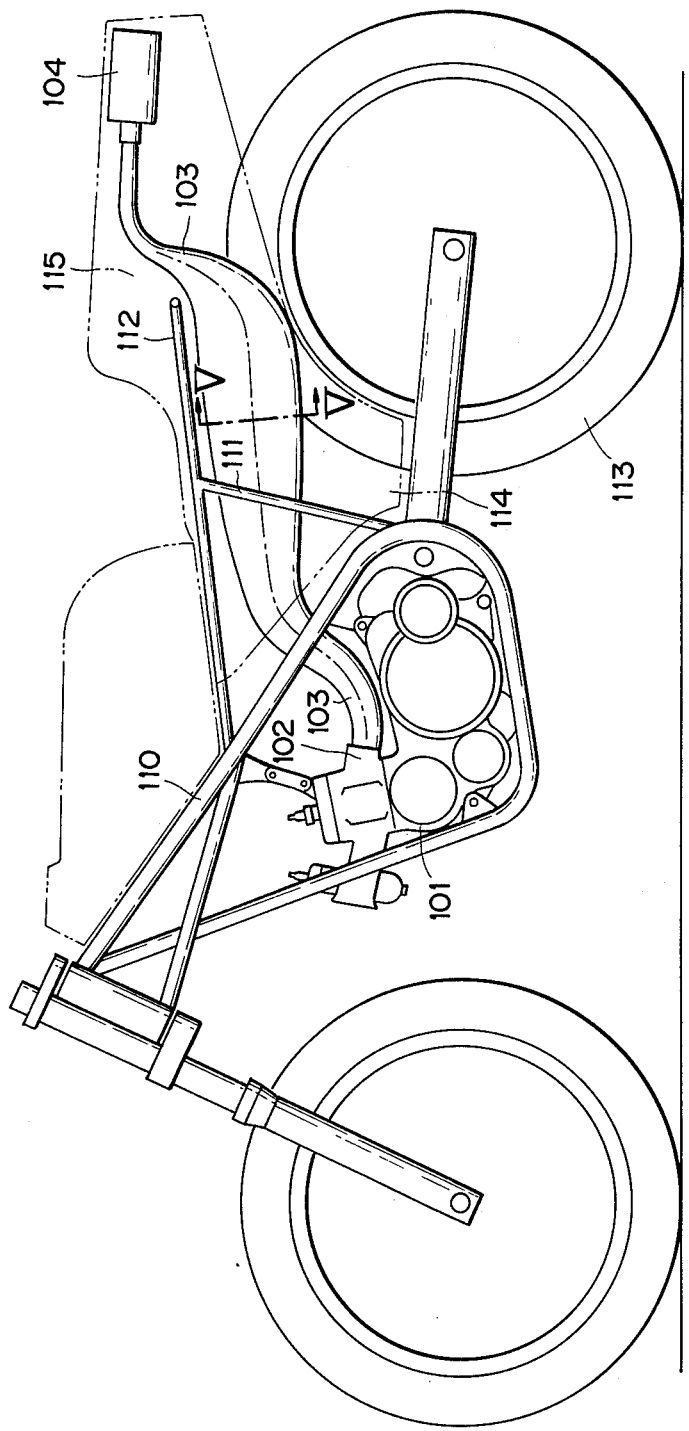
FIG. 3 is a left side view of principal portions of a two-wheeled motor vehicle provided with an exhaust system according to a second embodiment of the present invention.

Referring now to FIG. 3, reference numeral 101 designates an engine unit in a two-wheeled motor vehicle. A pair of right and left exhaust pipes 103 connected to exhaust ports 102 of the engine unit 101 are disposed inside right and left center pillars 110 and back stays 111. The exhaust pipes 103 are each bent so as to extend up to the level of right and left seat rails 112 and then extend beyond the rear ends of the seat rails 112, with their extending end portions being connected to a pair of silencers 104.

The exhaust pipes 103 and the silencers 104 are positioned inwardly of right and left side covers 114 and a rear cowling 115 without interference with a rear wheel 113 so that the rear wheel 113 is sandwiched therebetween from the right and left sides.

Figure 4:
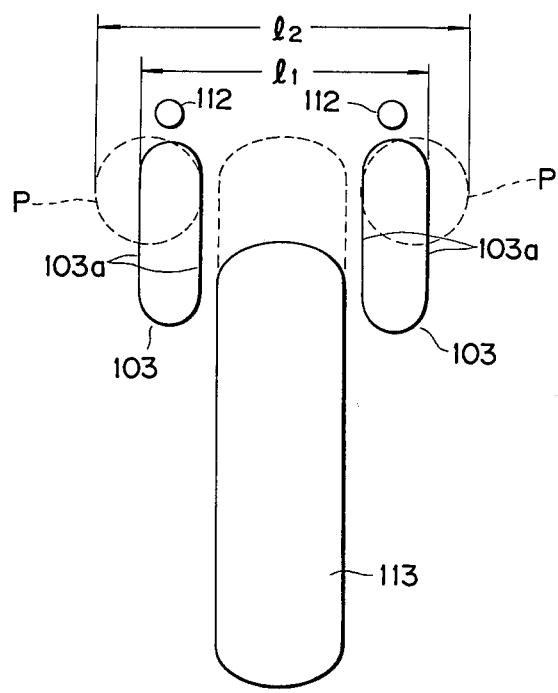
FIG. 4 is a rear view of principal portions of the two-wheeled motor vehicle of FIG. 3, also serving as an illustration for comparison with known arrangements.
Figure 5:
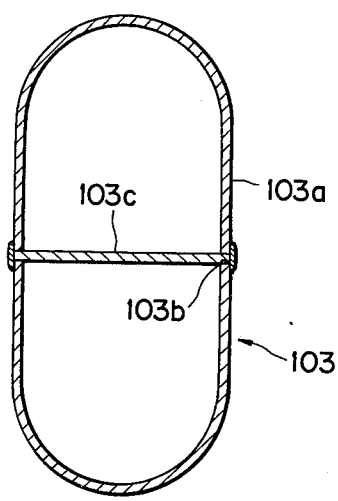
FIG. 5 is an enlarged sectional view taken along line V—V of FIG. 3.

Referring now to FIGS. 4 and 5, the exhaust pipes 103 are each provided with opposed side walls 103a in the vehicular transverse direction. The side walls 103a are formed substantially in the shape of a plane, and the sectional shapes thereof are substantially elliptical with the side walls 103a as long sides. In approximately intermediate positions of the side walls 103a are formed a plurality of slit pairs 103b, and in each slit pair 103b is inserted and fixed a reinforcing plate 103c of a narrow width to interconnect and reinforce both side walls 103a.

According to the construction described hereinabove, as compared with a conventional exhaust pipe P having a substantially circular section (shown in dashed line in FIG. 4), the amount of projection in the vehicular transverse direction can be decreased by $l_2-l_1$ wherein $l_1$ is a distance between the outermost wall surfaces of the paired right and left exhaust pipes 103 in this embodiment and $l_2$ is the same distance in the arrangement of conventional exhaust pipes P.

Further, because the exhaust pipes 103 are shaped so as to have planar portions, it becomes easier to mount support members for fixing the exhaust pipes 103 to the vehicular frame.

On the other hand, vibrations caused by pulsating waves at positive and negative pressure occurring within the exhaust pipe 103 are effectively diminished because the planar side walls 103a are reinforced and their rigidity improved by disposing a plurality of reinforcing plates 103c between the opposed side walls 103a of the exhaust pipe 103.

Figure 6:
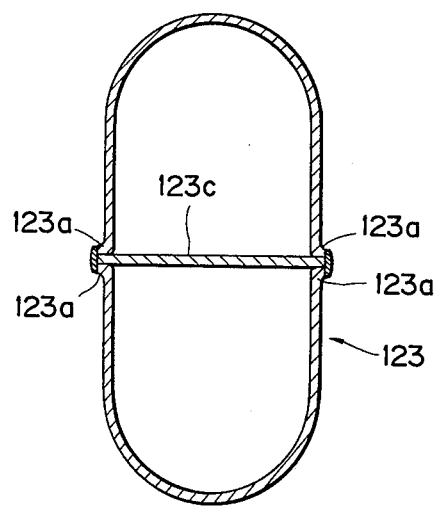
FIG. 6 is a view similar to FIG. 5 of an exhaust system according to a third embodiment of the present invention.

With reference to FIG. 6, there is shown an exhaust pipe 123 fabricated by joining, through flanges 123a, upper and lower members obtained by press molding. A gap for insertion therein of a reinforcing plate 123c is formed by notching the flanges 123a partially, and the reinforcing plate 123c may be inserted and welded therein.

Figure 7:
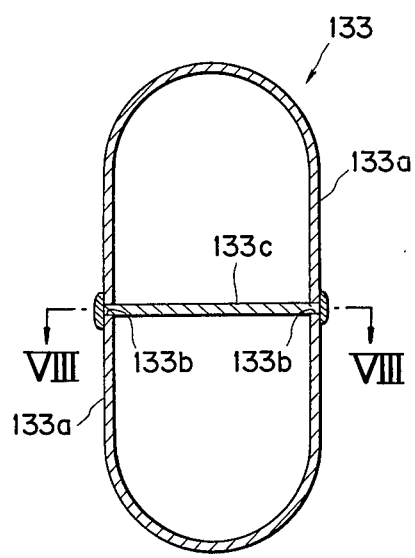
FIG. 7 is a view similar to FIG. 5 of an exhaust system according to a fourth embodiment of the present invention.
Figure 8:
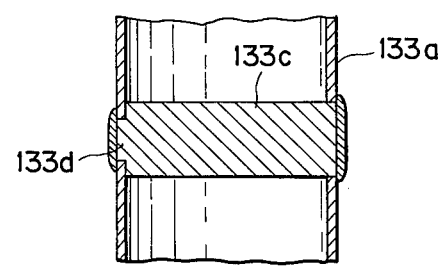
FIG. 8 is a sectional view taken along line VIII—VIII of FIG. 7.
Figure 9:
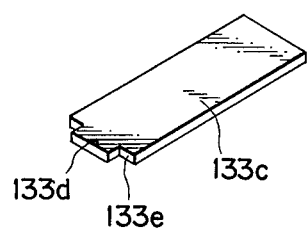
FIG. 9 is a perspective view of a reinforcing plate in the exhaust system of FIG. 7.
Figure 10:
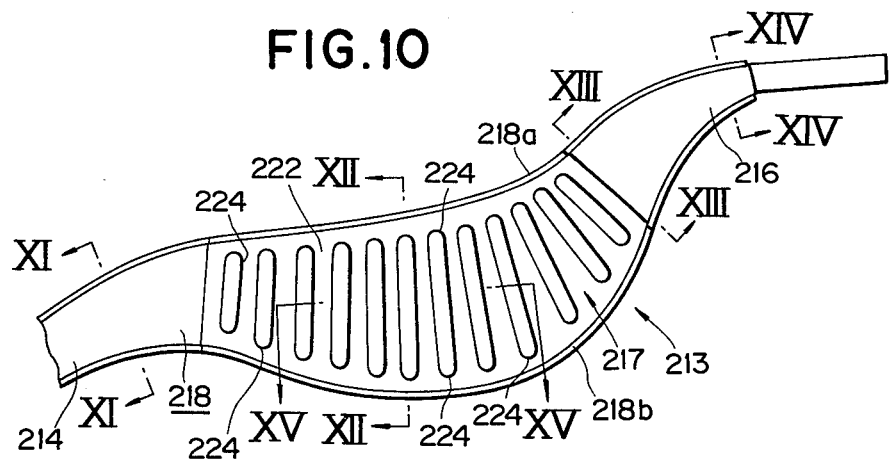
FIG. 10 is a left side view of principal portions of an exhaust system according to a fifth embodiment of the present invention.

As shown in FIGS. 7 through 9, a reinforcing plate 133c provided at one end thereof with a small projection 133d may be disposed between large and small slits 133b formed in opposed side walls 133a of an exhaust pipe 133, respectively. The shoulder portion 133e of reinforcing plate 133c is thus engaged with the inner surface of the associated side wall 133a, resulting in a further improvement not only with respect to reinforcing effect but also with respect to mounting performance.

Referring now to FIGS. 10 through 15, reference numeral 213 designates the entirety of an exhaust pipe. The exhaust pipe 213 comprises a front exhaust pipe portion 214 connected to the cylinder head of an engine (not shown), a rearmost exhaust pipe portion 216 connected to a silencer (not shown) which communicates with the atmosphere, and an expansion chamber 217 integrally formed between the front and rear pipe portions 214 and 216.

The front exhaust pipe portion 214, the expansion chamber 217 and the rear exhaust pipe portion 216 are formed continuously and integrally with one another, and as shown in FIGS. 11 through 14, a pair of right and left exhaust pipe halves 218 and 219 having an outwardly curved section are joined at the respective upper edges 218a and 219a by welding or other suitable means to provide a tubular shape.

Figure 11:
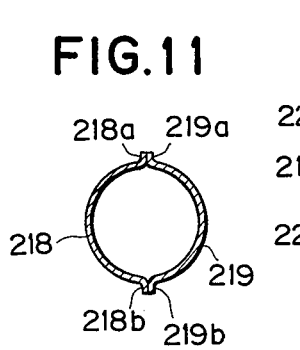
FIG. 11 is a sectional view taken along line XI—XI of FIG. 10.
Figure 12:
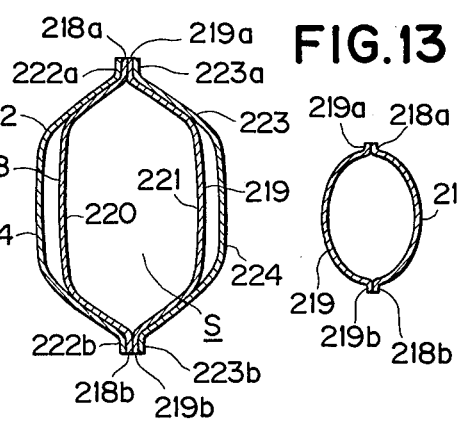
FIG. 12 is a sectional view taken along line XII—XII of FIG. 10.
Figures 13, 14:
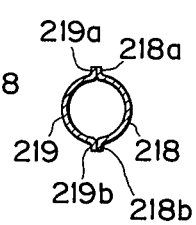
FIG. 13 is a sectional view taken along line XIII—XIII of FIG. 10.
FIG. 14 is a sectional view taken along line XIV—XIV of FIG. 10.
Figure 15:
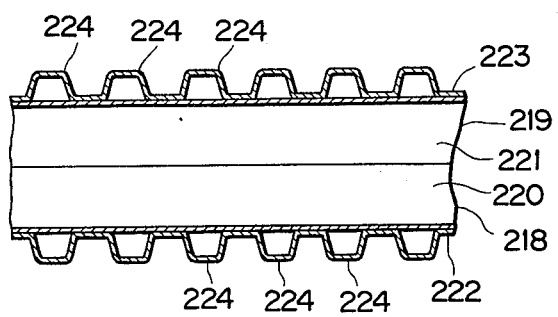
FIG. 15 is a sectional view taken along line XV—XV of FIG. 10.

The exhaust pipe halves 218 and 219 are each formed from a plate of a constant thickness by means of press molding or the like so as to have a relatively flat surface free from unevenness, and are constructed so as to integrally include right and left inner plate portions 220 and 221 of the expansion chamber 17. With respect to each portion of the exhaust pipe 213, the front exhaust pipe portion 214 is substantially circular in section, as shown in FIG. 11; the expansion chamber 217 has a substantially tortoise-shell sectional shape which is relatively thin in the transverse direction, as shown in FIG. 12; the portion between the expansion chamber 217 and the rear exhaust pipe portion 216 has a longitudinally elongated ellipse-like section, as shown in FIG. 13; and the rear exhaust pipe portion 216 is substantially circular in section, as shown in FIG. 14. Moreover, the exhaust pipe 213 gradually becomes larger in section from the front exhaust pipe portion 214 to the expansion chamber 217 and gradually becomes smaller in section from the expansion chamber 217 to the rear exhaust pipe portion 216.

Consequently, the expansion chamber 217 forms a relatively wide chamber S by means of the inner plate portions 220 and 221 for damping periodic shock waves induced by the gas discharged from the cylinder head of the engine.

The expansion chamber 217 is relatively weak in strength against the internal pressure induced by such shock waves because its section is non-circular as shown in FIG. 12, and therefore, with the inner plate portions 220 and 221 alone, the expansion chamber 217 may undergo a plastic deformation. To avoid such possibility, right and left outer plates 222 and 223 are fitted over the inner plate portions 220 and 221. The outer plates 222 and 223 comprise a pair of right and left halves formed from substantially the same material and in substantially the same shape as the inner plate portions 220 and 221, with the respective upper edges 222a, 223a and lower edges 222b, 223b being integrally welded to the upper edges 218a, 219a and lower edges 218b, 219b of the halves 218 and 219, respectively. Further, the outer plates 222 and 223 are provided on both peripheral side portions thereof with a plurality of outwardly bulged stripe-like ribs 224 at predetermined intervals.

Thus, the inner plate portions 220 and 221 are formed into relatively flat surfaces which function in the manner as an ordinary expansion chamber, and at the same time the outer plates 222 and 223 are formed with the reinforcing ribs 224 and thereby enhance the strength of the inner plate portions 220 and 221.

Figure 16:
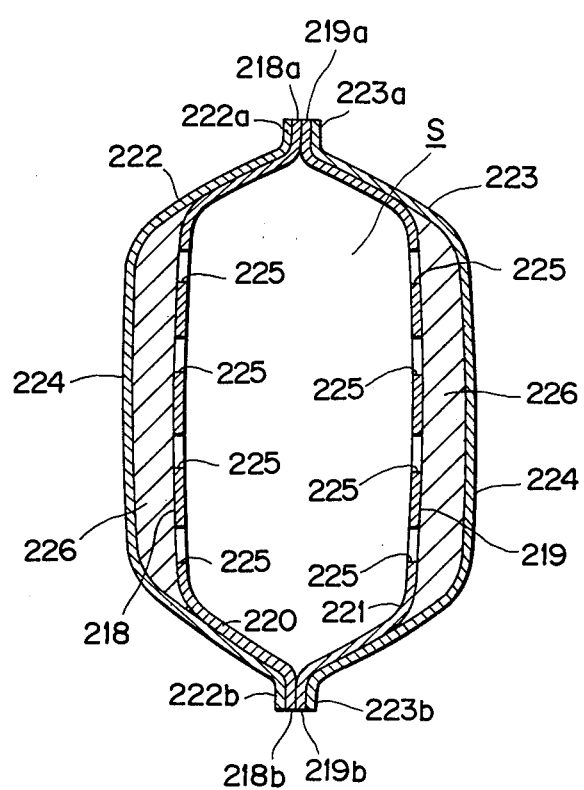
FIG. 16 is a view similar to FIG. 12 of an exhaust system according to a sixth embodiment of the present invention.

With reference to FIG. 16, the same reference numerals employed in the embodiment shown in FIGS. 10 through 15 represent like parts. In the embodiment of FIG. 16, a plurality of small holes 225 are formed in inner plate portions 220 and 221 opposed to ribs 224 and the space formed inside the ribs 224 is packed with a sound absorbing material 226 such as glass wool or the like.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. An exhaust system for a motor vehicle having at least one rear wheel and a rear cowling member extending over said rear wheel so as to substantially cover same, comprising:
   at least one exhaust pipe and at least one silencer connected to the rear end of said exhaust pipe, said silencer being at least partially disposed within the interior of said rear cowling member;
   said silencer being disposed substantially above said rear wheel;
   said motor vehicle being provided with an engine unit disposed in a substantially intermediate position in the longitudinal direction of said vehicle; and
   said exhaust pipe comprising front and rear pipe portions of a relatively small section connected to said engine unit and said silencer, respectively, and an expansion chamber portion of a relatively large section through which said front and rear pipe portions are interconnected.

2. An exhaust system according to claim 1, comprising:
   a pair of said exhaust pipes wherein said expansion chamber portion is disposed on both right and left sides with respect to the center line of said motor vehicle; and
   a pair of said silencers disposed respectively on the right and left sides with respect to said center line of said vehicle.

3. An exhaust system according to claim 2, wherein: said paired exhaust pipes cross each other.

4. An exhaust system according to claim 1, wherein: in a cross section of said expansion chamber portion, at least the outside portion in the vehicular transverse direction of said expansion chamber portion is substantially flat in the vertical direction.

5. An exhaust system according to claim 4, wherein: said cross section of said expansion chamber portion has a substantially elliptical shape.

6. An exhaust system according to claim 5, wherein: said expansion chamber portion has a plurality of reinforcing plate members disposed in a spaced manner substantially along the center line thereof, each of said reinforcing plate members being disposed between both side walls in the vehicular transverse direction of said expansion chamber.

7. An exhaust system according to claim 6, wherein: said expansion chamber portion comprises upper and lower half members joined together through flanges; and
   said reinforcing plate members are each held at both ends thereof between said half members through notches formed in the associated flange portions.

8. An exhaust system according to claim 6, wherein: said reinforcing plate members are each provided at one end thereof with a projection fitted in a slit formed in one side wall of said expansion chamber portion, with the other end thereof being fitted in a slit formed in the other side wall of said expansion chamber portion.

9. An exhaust system according to claim 1, wherein: said expansion chamber portion comprises an inner tubular member having a substantially plain outside surface and an outer tubular member provided on the outside surface thereof with a plurality of ribs.

10. An exhaust system according to claim 9, wherein: said inner tubular member and said outer tubular member are integrally joined with each other through the respective upper portions thereof and the respective lower portions thereof.

11. An exhaust system according to claim 10, wherein:
   each said inner tubular member and said outer tubular member comprises right and left halves joined together through flanges.

12. An exhaust system according to claim 9, wherein: said expansion chamber portion includes a sound absorbing material packed between said inner tubular member and said outer tubular member.

13. An exhaust system according to claim 5, wherein: said expansion chamber portion comprises an inner tubular member having a substantially plain outside surface and an outer tubular member provided on the outside surface thereof with a plurality of ribs.

* * * * *